DECODER FOR REFLECTED BINARY CODES

Filed Feb. 10, 1948 3 Sheets-Sheet 1

INVENTOR
R. L. CARBREY
BY Harry C. Hart
ATTORNEY

Jan. 16, 1951 R. L. CARBREY 2,538,615

DECODER FOR REFLECTED BINARY CODES

Filed Feb. 10, 1948 3 Sheets-Sheet 2

INVENTOR
R. L. CARBREY
BY Harry C. Hart
ATTORNEY

Jan. 16, 1951 R. L. CARBREY 2,538,615

DECODER FOR REFLECTED BINARY CODES

Filed Feb. 10, 1948 3 Sheets-Sheet 3

INVENTOR
R. L. CARBREY
BY Harry C. Hart
ATTORNEY

UNITED STATES PATENT OFFICE 2,538,615

DECODER FOR REFLECTED BINARY CODES

Robert L. Carbrey, Summit, N. J., assignor to Bell Telephone Laboratories, Incorporated, New York, N. Y., a corporation of New York Application February 10, 1948, Serial No. 7,440

16 Claims. (Cl. 178—43.5)

This invention relates to pulse code reception and particularly to novel apparatus for receiving code pulse groups which represent signal amplitudes in accordance with the reflected binary code, and for translating them into signal amplitude samples.

In application Serial No. 785,697, filed November 13, 1947, by F. Gray there is described a novel code which offers certain distinct advantages in pulse code transmission. These advantages follow from a particular feature of the code, namely, that no two successive numbers differ in more than one digit. The novel code has been termed "a reflected binary code." The name arises from the manner in which the code is constructed which, briefly, is as follows:

First, write down the first two numbers in the 1-digit orthodox binary number system, thus:

| | |
|---|---|
| Zero | 0 |
| One | 1 |

There is only one digit, so that there is no question of a difference among the symbols in more than one digit.

Second, below this array write its "reflection" in a transverse axis:

| | |
|---|---|
| Zero | 0 |
| One | 1 |
| | 1 |
| | 0 |

The symbols still differ in not more than one digit. However, the first is identical with the fourth and the second with the third.

Third, to remove this ambiguity, add a second digit to the left of each symbol, 0 for the first two symbols and 1 for the last two, thus:

| | |
|---|---|
| Zero | 00 |
| One | 01 |
| Two | 11 |
| Three | 10 |

and identify the last two symbols with the numbers "two" and "three." Each symbol is now unique and differs from those above and below it in not more than one digit. The array is a representation of the first four numbers in the primary 2-digit reflected binary number system.

The process is next repeated, giving

First:

| | |
|---|---|
| Zero | 00 |
| One | 01 |
| Two | 11 |
| Three | 10 |

Second:

| | |
|---|---|
| Zero | 00 |
| One | 01 |
| Two | 11 |
| Three | 10 |
| | 10 |
| | 11 |
| | 01 |
| | 00 |

Third:

| | | |
|---|---|---|
| Zero | 000 | Table I |
| One | 001 | |
| Two | 011 | |
| Three | 010 | |
| Four | 110 | |
| Five | 111 | |
| Six | 101 | |
| Seven | 100 | |

Table I is a representation of the first eight numbers, zero to seven, inclusive, in the reflected binary code in its primary form. By following the process explained above, this table may be extended indefinitely.

In going from the conventional binary system to the binary pulse code, it has been customary to employ "on" pulses for the 1's and "off" pulses or blank pulse positions for the 0's. Thus, for example, in the primary 7-digit reflected binary number system, the number 38 is written:

Thirty-eight=0110101 and the corresponding reflected binary code pulse group is

–, P, P, –, P, –, P where "–" stands for a blank pulse position and "P" stands for an "on" pulse.

It is, of course, equally possible to identify "off" pulses with 1's and "on" pulses with 0's, which would give, instead, one of the secondary forms

P, –, –, P, –, P, –

Other secondary forms of the reflected binary code may be obtained in various ways. Vertical columns in Table I may be interchanged. For any such transposition the pattern may be split along any horizontal division line between rows, and the lower part placed above the upper part, to give a new pattern with the same properties as the primary one. Again, the initial process of building up the code by reflection may be modified, giving two alternatives for the 1-digit code, four for the 2-digit code, and so on. The four alternatives for the 2-digit code are tabulated below. Of these the first is the primary one discussed above, the others being variants.

| Number | Primary | First Variant | Second Variant | Third Variant |
|---|---|---|---|---|
| Zero | 00 | 10 | 01 | 11 |
| One | 01 | 11 | 00 | 10 |
| Two | 11 | 01 | 10 | 00 |
| Three | 10 | 00 | 11 | 01 |

For illustrative purposes, the primary reflected code will henceforth be adhered to.

The Gray application describes apparatus for deriving reflected binary code groups of pulses from amplitude samples of a signal to be transmitted and for retranslating such pulse groups, at a receiver station, into signal amplitude samples for reproduction.

As is well known, the value of a number is obtained from its representation in the conventional code by weighting the various digits in proportion to $2^{d-1}$, where $d$ is the digit number, and adding the results. Thus, for the number thirty-eight, which in the 7-digit conventional binary code is written:

Thirty-eight=0100110, $$\left.\begin{array}{l} d_7(=0)\times 2^6=\text{Zero} \\ d_6(=1)\times 2^5=\text{Thirty-two} \\ d_5(=0)\times 2^4=\text{Zero} \\ d_4(=0)\times 2^3=\text{Zero} \\ d_3(=1)\times 2^2=\text{Four} \\ d_2(=1)\times 2^1=\text{Two} \\ d_1(=0)\times 2^0=\text{Zero} \end{array}\right\} \text{Table II}$$

Thirty-eight

The aforementioned Gray application points out that a number may be obtained from its representation in the reflected binary code in its primary form by a related but different process. Such a process is to (a) weight the various digits in proportion to $2^d-1$, (b) changing the signs of alternate non-zero digits starting with the second most significant one and proceeding in order of decreasing significance, (c) adding the results. The second step is equivalent to multiplying by $(-1)^S$, where S is the number of digit pulses in the symbol with digit numbers greater than $d$. Thus for the number thirty-eight, which in the 7-digit reflected binary code is written:

Thirty-eight=0110101, $$\left.\begin{array}{l} d_7(=0)\times(2^7-1)\times(-1)^0=\text{Zero} \\ d_6(=1(\times(2^6-1)\times(-1)^0=+\text{Sixty-three} \\ d_5(=1)\times(2^5-1)\times(-1)^1=-\text{Thirty-one} \\ d_4(=0)\times(2^4-1)\times(-1)^2=\text{Zero} \\ d_3(=1)\times(2^3-1)\times(-1)^2=+\text{Seven} \\ d_2(=0)\times(2^2-1)\times(-1)^3=\text{Zero} \\ d_1(=1)\times(2^1-1)\times(-1)^3=-\text{One} \end{array}\right\} \text{Table III}$$

Thirty-eight

It is the principal object of the present invention to provide simple and reliable apparatus for carrying out the operations indicated in Table III and thus translating successive incoming reflected binary code pulse groups into signal sample amplitudes for reproduction, i. e., "decoding" the same.

A subsidiary object is to provide a simple and reliable circuit which gives an output when, and only when, three or more distinct inputs are simultaneously applied to it.

The invention will be fully apprehended, and other objects will appear from the following detailed description of a preferred embodiment thereof, taken in conjunction with the appended drawings in which.

Figure 1:
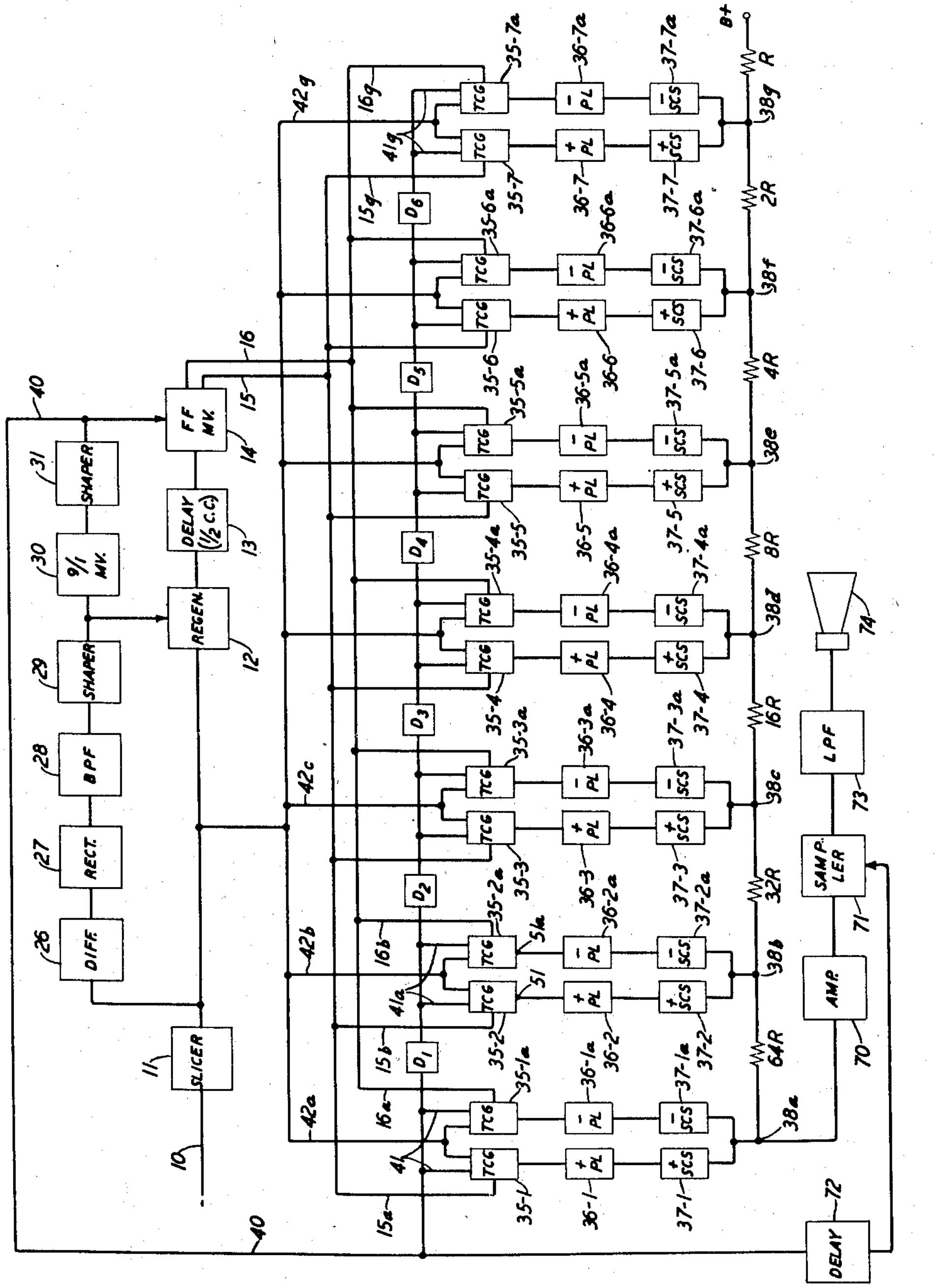
Fig. 1 is a schematic block diagram of decoding apparatus in accordance with the invention.
Figure 4:
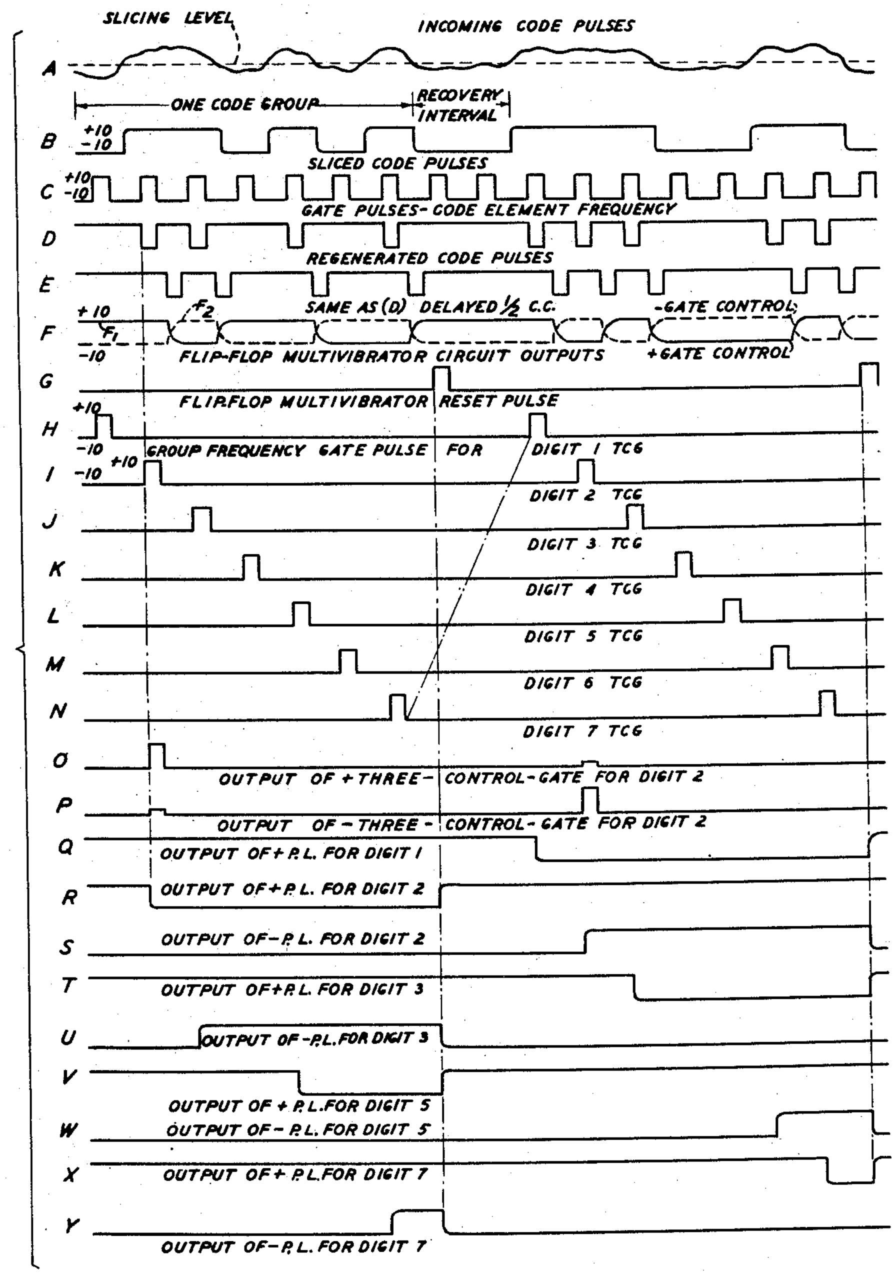
Fig. 4 is a wave form diagram of assistance in connection with explanations of the operations of the apparatus of Fig. 1.

Referring now to the drawings and especially to Fig. 1, a sequence of incoming reflected binary code pulse groups is to be conceived of as reaching the apparatus by way of the incoming line 10. Each pulse group is a reflected binary code representation of a particular amplitude sample of a message or other signal being transmitted, and the various pulses within a single code pulse group are arranged in accordance with the reflected binary code. Curve A of Fig. 4 shows typical wave forms for two such pulse groups.

Figures 2, 3:
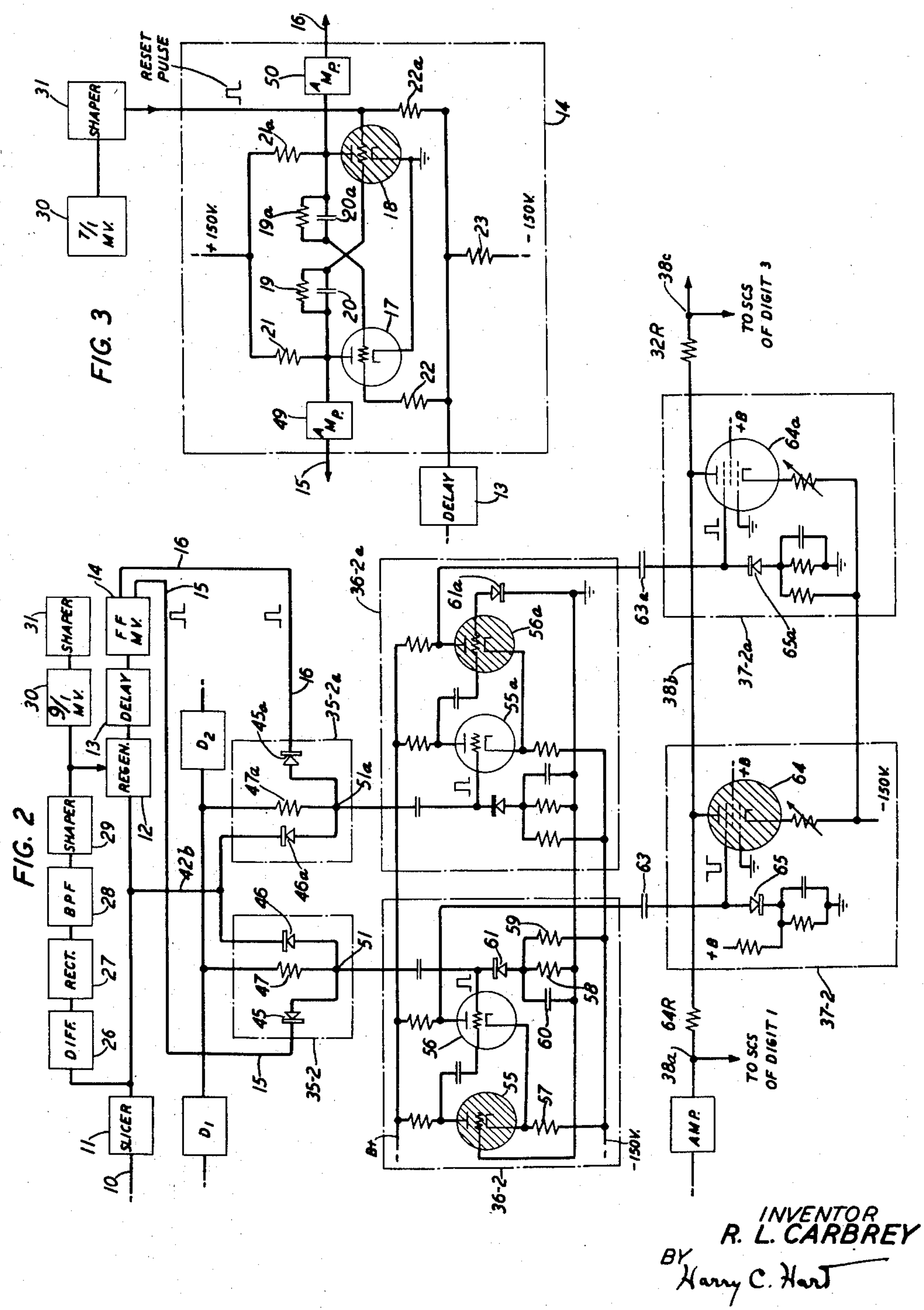
Fig. 2 is a schematic circuit diagram of portions of Fig. 1.
Fig. 3 is a schematic circuit diagram of another portion of Fig. 1 showing circuit details.

The pulses are preferably first standardized in amplitude as by a slicer 11. Curve B of Fig. 4 shows the same wave forms after slicing. The sliced pulses are next gated at their correct nominal occurrence times to produce short sharp pulses occurring at the exactly correct instants. To this end they are applied to a time regenerator 12 which may comprise a pentode, the incoming pulses being applied to a control grid and narrow gating pulses (curve C) derived as hereinafter described, being applied to the suppressor grid. With positive pulses on both grids, the output D taken from the anode of such a gate consists of negative pulses occurring only when both a code pulse B and a gating pulse C are present. These output pulses are next applied to a delay device 13 of any suitable variety whose time delay is adjusted to be equal substantially to one-half of a code element period, and the pulses as thus delayed (curve E) are then applied to a double stability circuit or flip-flop multivibrator 14 having two output conductors 15, 16. The details of a suitable circuit of this character are shown in Fig. 3. The circuit comprises a pair of triodes 17, 18, the anode of each being connected to the control grid of the other by way of a direct current connection; i. e., by way of resistors 19, 19a. Each resistor may be bypassed by a condenser 20, 20a to permit strong coupling for transient voltages. The anodes of the two tubes are supplied from a source of suitable potential such as 150 volts by way of loading resistors 21, 21a. The control grids are returned to the negative terminal of a potential source by way of individual resistors 22, 22a and a common resistor 23 while the cathodes are grounded. The values of the resistors are selected so that, in the absence of input signals, either one of the triodes 17, 18 is conductive while the other is held well below cut-off by reason of the direct current coupling. Input pulses from the delay device 13 may be applied to various points of such circuit, a suitable point being the junction of the two individual grid resistors 22, 22a with the common grid resistor 23. As is well known, application of successive like negative pulses (curve E) to this circuit successively alters the conduction distribution as between the two tubes 17, 18. That is to say if, for example, the left-hand tube 17 is non-conducting while the right-hand tube 18 is conducting, application of the first pulse of a series to the two grid resistors together drives the right-hand tube 18 below cut-off and establishes conduction in the left-hand tube 17. Output voltages may likewise be taken from various points of such a circuit, suitable points being the anode terminals of the two tubes. As is well known, the voltage at each of these points and therefore the wave forms of the voltages appearing on the two output conductors 15, 16 of Fig. 1 are inverse with respect to each other, as indicated in curve F of Fig. 4. The utilization of these voltages in the decoding process will be described subsequently.

In order to provide properly spaced gating pulses to operate the regenerator 12, the incoming pulse train (curve B) is also led through another path which comprises a differentiating circuit 26, a rectifier 27, a band-pass filter 28 and a shaper 29 connected in tandem in the order named. This arrangement of apparatus is described as shown in an application of J. G. Kreer and E. Peterson, Serial No. 776,280, filed September 26, 1947, and issued October 31, 1950, as Patent 2,527,638. As described in that application, this apparatus reproduces the basic pulse frequency (curve C) of the transmitted code pulse train. As a specific example, this frequency may be 72 kilocycles per second. In addition to providing timed pulses for the regenerator 12, this frequency may operate a frequency divider 30 of which the frequency ratio is somewhat greater than the number of digits of the code. Thus, with the seven digit code, the frequency divider 30 should produce output pulses whose frequency is one-ninth of the frequency of the basic timing source. A step-down multivibrator of the type described in L. A. Meacham Patent No. 2,022,969 is a suitable instrument for the purpose. Its output pulses are next squared and standardized in form by a shaper circuit 31 for use as described hereinafter.

Coming now to the decoding apparatus proper, the essential elements are shown in Fig. 1 below the apparatus just described. These elements comprise a group of similar pairs of units, each member of each pair comprising, in turn, a three-control gating circuit 35(TCG), a pulse lengthener 36(PL), and a standard current source 37(SCS). The number of pairs is equal to the number of digits in the code; e. g., in the example taken which applies to a seven digit code, there are seven similar pairs, one pair corresponding to each digit. In Fig. 1, the elements of the several pairs are distinguished by numerical suffixes, and right-hand elements are further distinguished from left-hand elements by an additional suffix "*a*." Thus the left-hand pulse lengthener of the second digit pair is numbered 36—2, while the right-hand standard current source of the fifth digit pair is numbered 37—5*a*. The output terminals of the two standard current sources 37 of the several pairs are connected to the junction points 38*a* to 38*g*, inclusive, between the several members of a weighting network of resistors R, 2R, 4R, etc. which are connected in series between a potential source or reference point B+ and an evaluating circuit to be described hereafter. The individual values of the resistors of this series are proportional to numbers 1, 2, 4, 8, 16, 32 and 64; that is, to the various successive powers of the number 2.

Each of the three-control gates 35, whose circuit details will be fully described hereafter, is controlled from three sources. The first control of these gates consists in a regular sequence of pulses (curves H through N) occurring at the pulse group rate, and derived from the step-down multivibrator 30 by way of the shaper 31. These are led to the decoding apparatus by way of the conductor 40 and are applied to the several pairs of gates in regular time sequence and to both members of a pair simultaneously. Thus they are applied to both gates 35—1 and 35—1*a* of the first pair by way of the conductors 41. Curve H represents these pulses. Simultaneously they are applied to a delay device $D_1$, which contributes a delay equal to a single pulse period which, in the case of the 72 kilocycle pulse repetition rate is $1/_{72,000}$ second or 13.9 microseconds. The delay device $D_1$ which may be a uniform transmission line of appropriate length and propagation constants, or any other suitable delay device.

Pulses as thus delayed by the device $D_1$ (curve I) are next applied simultaneously to the two three-control gates 35—2 and 35—2*a* of the second pair by way of the conductors 41*a*, and at the same time to the delay device $D_2$ which may be similar to the delay device $D_1$ and similarly delays the pulses by one code element period. A sequence of $n-1$, where $n$ is the number of digits in a code group, and which in the case of the 7-digit code is a sequence of six, such delay devices are provided, each one connected between the group rate input terminals of adjacent pairs of gates, so that each one of the pulses of the group frequency train, arriving by way of the conductor 40, is applied at a single instant to one and only one of the three-control gate pairs. Their arrival at each pair of gates is timed to occur at the nominal center of the code element pulse or space.

The second control of these gates is secured by the application to them of the pulses of the incoming code pulse train (curve B), after they have been standardized in amplitude by slicing. They are derived from the output of the slicer 11 and are applied by way of conductors 42*a*, 42*b*, etc., to all of the gates 35 in parallel and simultaneously.

The third control of the several three-control gates 35 differs as between the two members of each pair. It is derived from the flip-flop multivibrator 14. Control voltage is applied to the left-hand or "positive" members of all pairs by way of the conductor 15, for example, from the anode of the left-hand tube 17 of Fig. 3, while control voltage is applied to the right-hand or "negative" members of all pairs by way of the conductor 16, for example the anode of the right-hand tube of Fig. 3.

As above explained these two output voltages of the flip-flop multivibrator 14 are inverse with respect to each other. That is to say, prior to the application to the flip-flop circuit of the first negative (delayed) pulse of a group (curve E of Fig. 4) a positive control potential (curve $F_1$) is applied simultaneously and in parallel to all the left-hand members of the several three-control gate pairs while a negative control potential (curve $F_2$) is simultaneously applied to the right-hand members. However, upon arrival of the first delayed pulse (curve E) at the input terminals of the flip-flop circuit 14, this condition is reversed and a negative potential (curve $F_1$) is applied to all the left-hand members of the several gate pairs while a positive potential (curve $F_2$) is simultaneously applied to the right-hand members.

Fig. 2 shows in greater detail the elements of some of the units of Fig. 1 which are there indicated by blocks. The units selected for detailed representation are those of the second-digit unit pair, though each of the other pairs may be similar. The left-hand three-control gate 35—2 comprises two unilaterally conducting devices or diodes 45, 46 and a resistor 47. The diodes may be, for example, point contact rectifiers and are so shown on the drawing, though unilaterally conducting diodes of other types serve equally well. The anodes of the two diodes are connected together and to the output terminal of the resistor. Similarly, the right-hand three-control gate 35—2*a* comprises a pair of diodes 45*a*, 46*a* and a resistor 47*a*, the anodes of the two diodes being connected together and to one terminal of the resistor. If the actuation were by negative pulses, instead of positive, the cathodes could in each case be connected together, instead.

The cathode of the left-hand diode 45 of the left-hand gate 35—2 is connected by way of the conductor 15 to the anode of the triode 17 of the flip-flop circuit 14 while the cathode of the right-hand diode 45*a* of the right-hand gate 35—2*a* is connected by way of the conductor 16 to the anode of the other triode 18 of the flip-flop circuit 14. In each case these connections may be by way of a buffer amplifier 49, 50 or other isolating circuit as desired. The cathodes of the right-hand diode 46 of the left-hand gate 35—*a* and the left-hand diode 46*a* of the right-hand gate 35—2*a* are connected together and to the conductor 42*b* which carries the standardized pulses (curve B) of the incoming pulse train. The upper terminals of the two resistors 47, 47*a* are connected together and to the source of group frequency pulses appropriate to the particular gate pair. Thus, regarding the three-control gate of Fig. 2 as comprising the second pair measured from left to right of Fig. 1, that is to say the pair assigned to the decoding of No. 2 digit pulses, these two resistors are connected to the output terminal of the delay device $D_1$, and receive pulses as represented in curve I. In a similar fashion, the corresponding resistors of the seventh or last pair of gates are connected to the output terminals of the sixth delay device $D_6$, and receive pulses as represented in curve N.

In order to minimize the average current of each of the three-control gates, it is desirable to drive each of the three elements from driving sources whose direct current potentials are alike in the absence of a positive pulse. Thus, when no pulses are present on the inputs to any of the three elements of a gate, their terminals will all be at the same potential so that no current will flow through the gate. It is also desirable to have all pulses of approximately the same amplitude. Thus, for example, the several sources of the wave forms B, F and H through N of Fig. 4 may all be biased so that their base lines are at −10 volts, and all pulse amplitudes may be 20 volts; so that the peak voltage would be +10 volts. Coupling condensers and suitable bias sources may be freely employed for this purpose in known manner.

The combination of the two diodes 45, 46 and the resistors 47 in each of the three-control gates 35 constitutes a time-coincidence gate circuit which responds by delivering an output pulse at the terminal 51 when, and only when, each of the three controls is supplied with an input pulse. Thus, consider that a positive pulse curve I has been applied to the resistor 47. Substantially no voltage appears on the output terminal of the circuit because the output terminal of this resistor is substantially short-circuited to the input reference potential by either or both of the diodes 45, 46 which are in their low resistance condition by reason of the positive potential connected to their anodes through the resistor 47. The amount of potential rise at the end of the resistor which is connected to the diodes is only that required to make the diodes low resistance. For example, a typical point contact rectifier diode has a resistance of 150 ohms when the voltage drop across it is 1 volt, and the resistance element 47 may conveniently be 3,000 ohms. When, to use the potentials from the previous example, the input terminal of this resistor is driven from −10 to +10 volts, while the input terminal of one diode remains at −10 volts, the common junction rises only to about −9 volts because the network appears as a divider consisting of 3,000 ohms in series with approximately 150 ohms with about 19 volts drop across the 3,000 ohm resistor and about 1 volt across the diode. Assuming now that a positive pulse (curve F) from the flip-flop circuit 14 reaches the cathode of the left-hand diode 45, it is rendered substantially non-conductive by the pulse because its cathode is driven positive with respect to its anode, but the right-hand diode 46 continues to substantially short-circuit the resistor 47. If, however, there arrive at the same time at the cathode of the left-hand diode 45, a pulse from the flip-flop circuit 14, and, at the cathode of the right-hand diode 46, a pulse of the incoming code pulse train (curve B) both of the diodes become very high resistance paths and their shunting effect is negligible, and the output terminal of the resistor 47 assumes the same potential as its input terminal, +10 volts in the above example. Since the input signal to the resistor 47 is a short positive pulse, the output will also be a short positive pulse.

With these connections it will be understood that the left-hand gate 35—1 of the first digit gate pair delivers a positive output pulse on its output conductor, when and only when three events coincide, namely, (*a*) the presence of a pulse of group frequency on the conductor 40, which identifies the particular gate pair and so a particular code digit (the first); (*b*) the presence of a pulse of the incoming pulse train on conductor 42, and, (*c*) the presence of a pulse on the "positive" output conductor 15 of the flip-flop multivibrator 14 which determines the sign of the output. Similarly, the right-hand gate 35—2*a* of the second digit pair delivers an output pulse when and only when there coincides (*a*) a pulse of the group frequency, delayed by a single code element period by the delay device $D_1$, on conductors 41*a*, (*b*) a pulse of the incoming train on the conductor 42*b*, and (*c*) a pulse from the "negative" output conductor 16 of the flip-flop multivibrator 14.

The output pulses of the various three-control gates (curves O and P) are now lengthened to endure for the proper times as more fully described hereafter. The various pulse lengtheners 36—1 to 36—7*a*, may be of any desired type but a suitable one, here described with reference to the second digit pulse lengtheners 36—2 and 36—2*a* is a so-called single trip multivibrator, namely, a network comprising two triodes 55, 56, the anode of one triode being coupled by way of a condenser to the control grid of the other triode, while a common cathode resistor 57 is provided for direct current coupling in the reverse direction. In the case of the left-hand pulse lengthener 36—2, input pulses are applied to the right-hand, condenser-coupled control grid, and this grid is connected to a suitable point of a potential divider comprising resistors 58, 59 which are connected respectively to ground and to the negative terminal of a potential source, the resistor 58 being by-passed for alternating current by a condenser 60. A diode 61, for example, a point contact rectifier, may be inserted in the grid return path to stabilize voltage levels. The grid of the other tube 55 of this pulse lengthener may be grounded directly.

The pulse lengthener 36—2*a* which receives input pulses from the right-hand gate 35—2*a* of the pair is similar with two exceptions. First, the input pulses are applied to the grid of the left-hand tube 55*a* which is not condenser-coupled to the other anode. Second, the condenser-coupled grid is connected to ground by way of a stabilizing diode 61*a*.

With this arrangement, in the absence of applied pulses from the gates, the left-hand tube 55 of the left-hand lengthener 36—2 and the right-hand tube 55*a* of the right-hand lengthener 36—2*a* are in the conductive state, the two remaining tubes being held below cut-off. This condition is reversed in each case upon the arrival of an input pulse of positive polarity at the grid of the non-conducting tube. When so actuated the left-hand lengthener 36—2 furnishes a negative output voltage or the right-hand lengthener 36—2*a* furnishes a positive output voltage pulse, taken from the right-hand anode in each case. Construction and operation of the remaining pulse lengtheners of the group is similar.

These output voltages are taken by way of coupling condensers 63, 63*a* to suitable standard current sources 37—2, 37—2*a*. These may be of any desired variety, suitable ones comprising pentodes 64, 64*a* of which the first grid is grounded, the input pulses being applied to the third grid or so-called suppressor grid. These are returned by way of diodes 65, 65*a*, which again may be point contact rectifiers poled as shown, to a suitable point on a voltage divider connected, in the case of the left-hand standard current source 37—2 between ground and a positive potential source and, in the case of the right-hand standard current source 37—2*a* between ground and a negative potential source. With these connections, the left-hand pentode 64 is normally conductive and the right-hand pentode 64*a* is normally non-conductive. The normal conducting condition of the left-hand pentode 64 is altered to non-conduction by the arrival of a negative pulse from the pulse lengthener 36—2 on its suppressor grid, while the normal non-conducting condition of the right-hand pentode 64*a* is changed to the conducting condition by the arrival of a positive pulse from the pulse lengthener 36—2*a* on its suppressor grid. In the switching sequence either one or neither of the standard current sources may be switched. Both are not switched simultaneously.

As pointed out above, the output terminals of the two standard current sources which correspond to each digit pair are connected to the junction point of two adjacent resistors of the weighting network. In particular, the anodes of both pentodes 64, 64*a* for the second digit are connected to the junction point 38*b* between the resistor 64R and the resistor 32R, while the corresponding terminals of the standard current sources for the third digit pair are connected to the junction point 38*c* of the resistor 32R and the resistor 16R, and so on, those for the seventh digit pair being connected to the junction 38*g* of the resistor 2R and the resistor R. In the absence of input pulses from the pulse lengtheners, all seven of the left-hand pentodes are conducting. Assuming that each draws unit current from the potential source, the total voltage drop across the weighting network is equal to

| | | |
|---|---|---|
| 64R ohms×1 unit of current | = | 64R voltage units |
| +32R ohms×2 units of current | = | 64R voltage units |
| +16R ohms×3 units of current | = | 48R voltage units |
| +8R ohms×4 units of current | = | 32R voltage units |
| +4R ohms×5 units of current | = | 20R voltage units |
| +2R ohms×6 units of current | = | 12R voltage units |
| +1R ohms×7 units of current | = | 7R voltage units |
| or a total of | | 247R voltage units |

Now when any of the left-hand pulse lengtheners is actuated, its negative output pulse stops conduction of the associated standard current source, thus reducing the total voltage drop across the weighting network by the product of one unit of current by the sum of the resistances between the standard current source and the potential source or reference point. Specifically, the sum of the resistances between the second digit pentodes and the reference point is $$(32+16+8+4+2+1)R=63R$$

or a number proportional to 63, so that cutting off the current of the left-hand pentode, as happens when the associated three-control gate is actuated, reduces the voltage drop by 63 voltage units. It thus raises the potential of the end point 38*a* of the weighting network by 63 voltage units. Similarly, when the right-hand or negative three-control gate associated with any digit is opened, a positive voltage is applied by the right-hand pulse lengthener to the right-hand one of the corresponding standard current sources. This increases the voltage drop across the part of the weighting network between the connection point and the potential source, and so lowers the potential of the end point of the network, by a corresponding amount, which, in the case of the second digit negative gate is 63 voltage units. In other words, actuation of the left-hand or "positive" three-control gate for a particular digit gives rise to a positive voltage increment at the point 38*a* which is correctly proportioned to the digit-value, while actuation of the right-hand or "negative" three-control gate for a particular digit gives rise to a negative voltage increment at the same point, which again is correctly proportioned to the digit-value.

The individual values of the resistors of the weighting network are proportional to the numbers 64, 32, 16, 8, 4, 2, and 1. Specifically, their values may be 640, 320, 160, 80, 40, 20 and 10 ohms, respectively. Their sums, measured from the several connection points to the potential source are therefore 1270, 630, 310, 150, 70, 30 and 10 ohms, respectively. If, therefore, the current increments furnished by the standard sources all have the values, positive or negative, of 0.01 ampere, the voltage increments which appear at the point 38*a* are proportional to the numbers $$127, \pm 63, \pm 31, \pm 15, \pm 3 \text{ and } \pm 1$$

These are identically the values required by the formulae of Table III.

The voltage appearing at the point 38*a* is applied to an evaluating amplifier 70, which measures the amount of this signal and delivers an output signal proportional thereto to a sampler 71.

Inaccuracies in the values of the network resistors may be compensated by adjusting the currents of the standard sources by adjusting the cathode resistor of the pentode in each case.

By reason of the non-symmetrical character of the coupling between the left-hand and right-hand triode of the various pulse lengthening single-trip multivibrators each of these circuits, when left to itself will return to a particular conduction condition, indicated on the drawings by conduction of the left-hand tube in one case and to the right-hand tube in the other. The time which elapses between the application of an input pulse which upsets this condition and its return to its stable condition may be adjusted over a wide range and with considerable precision by proper choice of the values of the coupling condenser and of the various resistors, as is well known.

In accordance with the invention, the return time of the pulse lengtheners of the last or seventh digit group are adjusted to be equal to one code element period. The return time of the pulse lengtheners of the sixth digit group, namely, the last group but one, is adjusted to be equal to two code element periods. Similarly, with respect to the fifth, fourth, third, second and first apparatus group, the return times of the pulse lengtheners of the first group being adjusted to be equal to seven code element periods. From the foregoing description it is apparent that the various apparatus unit groups of Fig. 1 are enabled in time sequence and at the code element repetition rate, starting with the first and running regularly to the seventh. However, when once enabled and having received a pulse of the incoming train so that either the left-hand constant current generator of a pair or the right-hand one has produced a voltage rise or a voltage drop, respectively, across the resistor weighting network, this voltage rise or voltage drop as the case may be persists from the instant of its inception until the conclusion of the code pulse group.

By reason of the series connection of the resistors of the network, these various voltage rises and voltage drops are applied additively to the input terminals of the amplifier 70 which may be of any suitable variety, serving merely to deliver voltage at an adequate level to a sampler 71, and to isolate the resistor network from the sampler. In other words, it serves to present to the resistor network a very high impedance.

The resultant voltage applied to the sampler 71 is now sampled by the application of a pulse, derived by way of the shaper 31 from the 7 to 1 step-down multivibrator 30. A delay device 72 of any desired type may be included in this path, its delay time being adjusted so that the voltage amplitude samples are taken at the correct instants, namely, at the instants at which the last code element or digit pulse of each pulse groups has been made available at the sampler.

The sampler 71 itself may be of any desired type, a two-way clamp such as a double triode clamp circuit being suitable. Such clamps are well known and may comprise two triodes, the anode of each being connected directly to the cathode of the other, their grids being supplied with gating pulses by way of impulse coils or otherwise. Representative circuits are described in "Precision Circuit Techniques" by Britton Chance, published in the Review of Scientific Instruments for October 1946 at page 396.

The output of the sampler 71 is now applied by way of a low-pass filter 73 to a message reproducer 74.

To prepare the decoding circuit to decode the ensuing code pulse group, a pulse of the group frequency (curve G) is applied by way of the shaper 31 to restore the double stability flip-flop multivibrator 14 to its initial condition. Referring to Fig. 3, this may conveniently be accomplished by applying positive pulses from the shaper 31 to the right-hand or "negative" triode 18 of the flip-flop multivibrator 14.

When apparatus of the type described herein is employed in a multiplex system, it may be convenient to employ two similar decoding circuits, one associated with "odd numbered" time division channels and the other associated with "even numbered" time division channels. In this event, the single-trip multivibrators or other pulse lengtheners of the "odd numbered" decoder will have available to it the whole ensuing code pulse group, which is "even numbered" for restoration to its initial condition. Similarly, the "even numbered" single-trip multivibrator will have the ensuing "odd numbered" code pulse group for its restoration. A pulse group period is more than sufficient for such restoration of the multivibrator circuits to their initial condition.

If, on the other hand, the system is not used in connection with time division multiplex transmission but is used rather for a single coded message channel, it is desirable, in order to provide adequate time for the single-trip multivibrator circuits to return to their initial condition at the conclusion of each code pulse group, to provide a small blank time, that is, one or two blank code elements or pulse positions following the conclusion of each code pulse group. To this end, the frequency step-down ratio of the multivibrator which derives the group frequency has been selected at 9 to 1, though 8 to 1 may be sufficient. With the 9 to 1 ratio, the basic pulse repetition rate as produced at the transmitter station is adjusted to a frequency of 72 kilocycles per second. With the 8 to 1 ratio it is adjusted to 64 kilocycles per second. The first alternative provides a pair of blank time slots at the conclusion of each code pulse group and the second alternative provides a single blank time slot.

The manner in which the circuit arrangements of the invention operate to decode a pulse group (curve A of Fig. 4) representing the number thirty-eight in the reflected binary code of the aforementioned application of Frank Gray will now be described. The flip-flop multivibrator 14, having been restored to its initial condition at the conclusion of the prior code pulse group by application of the group frequency "reset" pulse to the grid of the right-hand tube 18 in Fig. 3, is now ready to perform its switching operation on the following code pulse group. Its condition of readiness is represented by a positive potential (curve $F_1$) applied to the left-hand members of all the three-control gates 35 and a negative potential (curve $F_2$) to the right-hand members. This condition holds until after the arrival of the first code element pulse actually present in the group, which, in the "thirty-eight" example above taken, is the No. 2 digit pulse (curve D). This pulse is applied simultaneously to all of the three-control gates 35.

At the same time, a pulse of the group frequency (curve I) arrives by way of the delay device $D_1$ to both of the three-control gates of the No. 2 digit pair, and this pair is the only pair of which the third controlling element, namely, the resistors 41 of Fig. 2, are enabled at this instant. Thus, a positive pulse (curve O) is delivered by the left-hand gate 35—2 to the left-hand lengthener 36—2 (curve R) which gives rise, by way of the left-hand standard current source 37—2 to a positive voltage increment applied to the weighting resistor network at the junction 38b of the resistors 64R and 32R, and ultimately appears as a voltage rise at the amplifier 70 which is to endure for six code element periods, and whose magnitude is proportional to the sum of all of the resistors except the largest; i. e., it is proportional to the number 63. After a delay of substantially one half code element period, the application of the No. 2 digit pulse (curve E) by way of the delay device 13 to the flip-flop multivibrator 14 reverses its conduction condition so that negative disabling potential is applied to all the left-hand gates 35 and positive enabling potential is applied to all the right-hand gates.

The next event to occur is the arrival of the No. 3 digit pulse (curve D). It is applied simultaneously and in parallel to all of the three-control gates, by way of the conductors 42. As just explained, all the left-hand gates are now disabled by the output of the flip-flop multivibrator 14 while positive enabling voltage is applied to the right-hand gates. However, at this particular instant, the only pair of gates to which a group frequency pulse is simultaneously applied is the No. 3 pair, to which the group frequency pulse (curve J) is applied by way of delay devices $D_1$ and $D_2$ in series. Thus, of all the gates, the right-hand member 35—3a of the third pair has received at the same time a positive enabling pulse (curve $F_2$) from the flip-flop multivibrator 14, the third digit pulse or code element (curve D) of the incoming group, and a pulse of the group frequency (curve J) derived from the 9 to 1 step-down multivibrator 30 and delayed by two code element periods. No others of the remaining thirteen gates is completely enabled, and therefore none of them is actuated. The enabled gate delivers a pulse by way of its pulse lengthener 36—3a (Curve U) and its standard current source 37—3a to the weighting resistor network at the junction 38c of the resistors 32R and 16R which appear as a voltage drop at the evaluating amplifier 70 as a result of the drawing of current through the right-hand pentode 64a of Fig. 2 and through the resistors R, 2R, 4R, 8R, 16R in series with the potential source.

The next or fourth pulse position is blank so that none of the three-control gates is actuated.

During the foregoing operations, the second pulse actually present, which occupies the third pulse position, has also been applied by way of the delay device 13 to the flip-flop multivibrator 14 to alter its condition and so apply positive enabling potential once more to all of the left-hand gates and negative disabling potential to all of the right-hand gates. This condition is not altered when the fourth pulse position occurs, because this pulse position is blank. Therefore, upon the arrival of the third code element pulse actually present (curve D) which occupies the fifth pulse position, all of the left-hand gates are enabled (curve $F_1$) by the flip-flop multivibrator 14. At the same instant, both members of the fifth digit gate pair, and no others, receive the group frequency pulse (curve L) by way of the delay devices $D_1$, $D_2$, $D_3$ and $D_4$ in series. Upon arrival of this third pulse actually present, it is applied as before to all of the gates simultaneously and together. However, the only gate which is enabled in all the necessary respects is the left-hand gate 35—5 of the fifth pair. It therefore delivers its pulse by way of its pulse lengthener 36—5 (Curve V) and its standard current source 37—5 which may be identical with the left-hand pentode 64 of Fig. 2, as a voltage rise across the resistors R, 2R and 4R in series.

At the same time the third pulse actually present, occupying the fifth pulse position, is applied, after a delay of approximately one-half the code element period (curve E) to the flip-flop multivibrator 14 to reverse its conduction condition and so provide for the application of positive enabling voltage (curve $F_2$) to the right-hand gates 35 of all pairs and negative disabling voltage (curve $F_1$) to the left-hand gates 35 of all pairs. Therefore, any output of the standard current sources 37 will take the form of a voltage drop across the weighting resistor network. The sixth pulse position, however, is blank so that none of the three-control gates is fully actuated at this particular time. The next event which takes place in sequence, and the final one, is the arrival of the seventh digit pulse or code element (curve D). As before, it is applied simultaneously and in parallel to all of the gates 35, of which only the right-hand ones have positive enabling potential (curve $F_2$) applied to them from the flip-flop multivibrator 14. At the same time, a group frequency pulse (curve N) is applied to both gates of the No. 7 pair by way of all of the delay devices $D_1$, $D_2$ . . . $D_6$ in series from the 9 to 1 step-down multivibrator 30. Therefore the only gate which is enabled by all three of the necessary controls is the right-hand gates 35—7a of the last pair. It therefore delivers its output, by way of its pulse lengthener 36—7a (curve Y) and its standard current source 37—7a, which may be identical with the right-hand pentode 64a of Fig. 2, as a voltage drop which now is developed across the resistor R and appears as a negative voltage increment proportional to R at the output terminal 38a and is impressed on the amplifier 70.

The foregoing sequence of operations can take place very rapidly.

It has been stated hereinabove that the return time of the pulse lengtheners of the first digit group is adjusted to seven code element periods; the return time of the pulse lengtheners of the second digit group is adjusted to six code elements, and so on (curves R, U, V, Y). Therefore, each of the various incremental voltage rises and voltage drops which have been applied across the various resistors of the weighting resistor network as described above, continue to exist until the conclusion of the code pulse group. As above explained, this voltage is amplified and sampled during intervals at which it has the correct value, proportional to the number to be decoded which in this example is thirty-eight. The voltage as thus sampled is now applied to a low-pass filter 73 to eliminate the sampling frequency and higher harmonics and sidebands thereof, and the filtered output is then applied to a reproducer 74.

Following the decoding of the pulse group representing the number thirty-eight as above described, the pulse lengtheners 36 are restored by relaxation to their original ready condition, and the flip-flop multivibrator 14 is similarly restored by the reset pulse (curve G). Two blank code element periods are provided for completion of these operations. Thereupon the apparatus is ready to decode the ensuing code pulse group which from curves A, B and D, is evidently P, P, P, –, –, P, P or in the numeral notation, 1110011. This represents the number 93 in the reflected binary code.

In the foregoing description, especially with reference to Fig. 1, all pairs of gates, pulse-lengtheners and standard current sources (the number of such pairs being seven for the seven digit code) have been treated as alike. This was to facilitate the exposition and to avoid the introduction of detailed considerations before the general ground work has been laid. However, the decoding of the reflected binary code in its primary form may be carried out without the use of the "negative" gate (the right hand one, 35—1a of Fig. 1) or of its associated pulse lengthener 36—1a and standard current source 37—1a. Indeed, it can be seen from the foregoing description of the operation of the apparatus that these elements do not come into play. In item (b) following Table II above, it is pointed out that the signs of alternate non-zero digits are changed, starting with the second. The physical counterpart of this is evidently that the voltage increments which are applied to the amplifier 70 may be positive or negative except for those originating in the gates of the first pair, which are always positive. If the first code element of a group is actually present as a pulse, it must always produce a voltage increment of the same sign, i. e., a positive increment. (Obviously, all signs could be reversed together without atlering the result.) As above explained, this is accomplished by always resetting the flip-flop multivibrator 14 at the termination of each code pulse group, so that the left-hand or positive members of the three-control gate pairs are always enabled during the first code element period of each code pulse group. As a result, the right-hand or negative member 35—1a of the first three-control gate pair is never fully enabled. This gate, therefore, together with its associated pulse-lengthener 36—1a and standard current source 37—1a can be dispensed with without in any way altering the decoding action as described above for the reflected binary code in its primary form. They may be useful in decoding the reflected binary code in forms other than the primary one, and in any event are harmless.

In the appended claims, the word "pulse" is employed to designate a pulse actually present in the code pulse group; i. e., a non-zero code element or pulse position.

What is claimed is:

1. A decoder for code groups of pulses, each group representing a message amplitude in the reflected binary code, said decoder comprising means for producing a signal of magnitude proportional to $2^d-1$ upon the occurrence of each pulse of a group, where $d$ is the digit number of said pulse, means for assigning one polarity to said signal for the first and each odd-numbered pulse of each group and for assigning the opposite polarity to said signal for the second and each even-numbered pulse of the group, and means for adding all of said signals together to provide a reproducible message amplitude upon the conclusion of the pulse group.

2. A decoder for code groups of pulses, each group representing a message amplitude in the reflected binary code, said decoder comprising means for producing a signal of magnitude proportional to $2^d-1$ at an instant related to the arrival instant of each pulse of a group, where $d$ is the digit number of said pulse, means for assigning one polarity to said signal for the first and each odd-numbered pulse of each group and for assigning the opposite polarity to said signal for the second and each even-numbered pulse of the group, and means for adding all of said signals together to provide a reproducible message amplitude at an instant related to the termination of the pulse group.

3. A decoder for code groups of pulses, each group representing a message amplitude in the reflected binary code, said decoder comprising means for producing a signal of magnitude proportional to $2^d-1$ at an instant related to the arrival instant of each pulse of a group, where $d$ is the digit number of said pulse, means for assigning one polarity to said signal for the first and each odd-numbered pulse of each group and for assigning the opposite polarity to said signal for the second and each even-numbered pulse of the group, means for maintaining each of said signals unchanged from the instant of its production to the termination of the pulse group, and means for adding all of said signals together to provide a reproducible message amplitude at an instant related to the termination of the pulse group.

4. A decoder for code groups of pulses, each group representing a signal amplitude in the $n$-digit reflected binary code, said decoder comprising means for receiving a train of incoming reflected binary code pulses, means for deriving the pulse repetition frequency from said train, means for deriving the group repetition frequency from said train, $n$ pairs of three-control gates, one pair for each digit of the code, each pair comprising a positive member and a negative member, first control means for partially enabling said pairs in sequence at the group repetition frequency, second control means for partially and simultaneously enabling all positive members for the first and all odd-numbered pulses of each received pulse group and all negative members for the second and all even-numbered pulses of each received pulse group, third control means responsive to the occurrence of a pulse of a group for partially and simultaneously enabling all of said members, means including said gates for producing a signal of magnitude proportional to $2^d-1$ on the occurrence of each pulse of a group, where $d$ is the digit number of a pulse of a group, means for assigning one polarity to said signal for the first and each odd-numbered pulse of each group and for assigning the opposite polarity to said signal for the second and each even-numbered pulse of the group, and means for adding all of said signals at the conclusion of each group.

5. Apparatus as defined in the preceding claim modified by the omission of the negative three-control gate of the pair corresponding to the digit of greatest significance in the code.

6. Apparatus as defined in claim 4 wherein each of said gates comprises a linear impedance element having an output terminal and an input terminal, two unilaterally conducting diodes each having an input terminal comprising a cathode and an output terminal comprising an anode, the anode of each diode being connected to the output terminal of the linear element, three separate signal sources, connections for applying pulses of the incoming train to one of said three input terminals, connections for applying pulses of the group repetition frequency to a second of said input terminals, and connections for applying sign-determining pulses to the third of said input terminals.

7. Apparatus as defined in the preceding claim modified by the omission of the negative three-control gate of the pair corresponding to the digit of greatest significance in the code.

8. A decoder for code groups of pulses, each group representing a signal amplitude in the $n$-digit reflected binary code, which comprises means for receiving a train of incoming reflected binary code pulses, means for deriving the pulse repetition frequency from said train, means for deriving the group repetition frequency from said train, a weighting network, $n$-pairs of three-control gates, one pair for each digit of the code, each pair comprising a positive member and a negative member, first control means for partially enabling said pairs in sequence at the group repetition frequency starting with the first, second control means for partially and simultaneously enabling all positive members for the first and all odd-numbered pulses of each received pulse group and all negative members for the second and all even-numbered pulses of each received pulse group, third control means responsive to the occurrence of a pulse of a group for partially and simultaneously enabling all of said members, said gates, when enabled by said three control means, delivering currents of standard magnitude to said weighting network, currents of positive members being of one sign and of negative members of opposite sign, means for deriving a voltage from each of said currents, said weighting network serving to weight said currents in proportion to $2^d-1$ where $d$ is the digit number of the pulse enabling the gate which delivers the respective currents, and means for adding all of said signals at the conclusion of each group.

9. Apparatus as defined in the preceding claim modified by the omission of the negative three-control gate of the pair corresponding to the digit of greatest significance in the code.

10. A decoder for code groups of pulses, each group representing a signal amplitude in the $n$-digit reflected binary code, said decoder comprising means for receiving a train of incoming reflected binary code pulses, means for deriving the pulse repetition frequency from said train, means for deriving the group repetition frequency from said train, a network of $n$ impedance elements connected in series, the individual values of said elements being related as successive real whole positive powers of 2 commencing with 2′, $n$ pairs of three-control gates, one pair for each digit of the code, each pair comprising a positive member and a negative member, first control means for partially enabling said pairs in sequence at the group repetition frequency, second control means for partially and simultaneously enabling all positive members for the first and all odd-numbered pulses of each received pulse group and all negative members for the second and all even-numbered pulses of each received pulse group, third control means responsive to the occurrence of a pulse of a group for partially and simultaneously enabling all of said members, each of said gates, when enabled by said three control means, delivering a current of standard magnitude to a junction point of two of said impedance elements, currents delivered by positive members being of one sign and currents delivered by negative members being of opposite sign, and means for adding all of said signals at the conclusion of each pulse group.

11. Apparatus as defined in the preceding claim modified by the omission of the negative three-control gate of the pair corresponding to the digit of greatest significance in the code.

12. A decoder for code groups of pulses, each group representing a signal amplitude in the reflected binary code, said decoder comprising a network of $n$ resistors connected in series, the individual values of said resistors being related as successive real whole positive powers of 2 commencing with 2′, a reference conductor connected to one end of said network, a pair of standard current sources connected in parallel to the end of each resistor remote from said reference conductor, the first member of said pair causing positive incremental current to flow through all resistors from said end to said reference conductor, the second member of said pair causing negative incremental current to flow through all resistors from said end to said reference conductor, a three-control gate associated with each of said sources and adapted, when fully enabled, to actuate said source, said gates being arranged in pairs, first control means for partially enabling said gate pairs in sequence, starting with the pair most remote from said reference conductor, and for transferring the partially enabled condition from pair to pair at the pulse repetition rate, second control means for completing the enablement of the first member of a partially enabled gate pair for odd-numbered code pulses and the second member of the partially enabled pair for even-numbered code pulses, third control means responsive to the occurrence of a pulse of a group for partially and simultaneously enabling all of said members, means for evaluating the resulting voltage across said network at the conclusion of each code group, and means for disabling all of said sources after said evaluation.

13. Apparatus as defined in the preceding claim modified by the omission of the second member of that standard current source pair which is most remote from the reference conductor, and of the three-control gate associated with it.

14. A decoder for code groups of pulses, each group representing a signal amplitude in the reflected binary code, said decoder comprising a network of $n$ resistors connected in series, the individual values of said resistors being related as successive real whole positive powers of 2 commencing with 2′, a reference conductor connected to one end of said network, a pair of standard current sources connected in parallel to the end of each resistor remote from said reference conductor, the first member of said pair causing positive incremental current to flow through all resistors from said end to said reference conductor, the second member of said pair causing negative incremental current to flow through all resistors from said end to said reference conductor, a three-control gate associated with each of said sources and adapted, when fully enabled, to actuate said source, said gates being arranged in pairs, means for partially enabling said gate pairs in sequence, starting with the pair most remote from said reference conductor, and for transferring the partially enabled condition from pair to pair at the pulse repetition rate, means for further partially enabling all of said gates on the occurrence of each pulse of an incoming code pulse group, means for further partially enabling the first members of all pairs for odd-numbered code pulses and the second members of all pairs for even-numbered code pulses, whereby only one of said gates is fully enabled at a time, the particular one being determined both by the digit number of the pulse and by its occurrence number, means for evaluating the resulting voltage across said network at the conclusion of each code group, and means for disabling all of said sources after said evaluation.

15. Apparatus as defined in the preceding claim modified by the omission of the second member of that standard current source pair which is most remote from the reference conductor, and of the three-control gate associated with it.

16. In decoding apparatus for reflected binary code pulse groups, a time coincidence gate circuit for delivering an output signal only upon the coincidence in time of a number $n$ of distinct input signals, which comprises a bilaterally conducting element having two terminals, a number $n-1$ of like unilaterally conducting elements having input terminals and output terminals, the output terminals of all of said elements being connected together and to a common load, a number $n$ of signal sources, connections for applying the signals of said sources to the several input terminals of said elements individually, and connections for utilizing the common potential of said output terminals.

ROBERT L. CARBREY.

REFERENCES CITED

The following references are of record in the file of this patent:

UNITED STATES PATENTS

| Number | Name | Date |
|---|---|---|
| 2,381,920 | Miller | Aug. 14, 1945 |
| 2,400,574 | Rea | May 21, 1946 |
| 2,443,198 | Sallach | June 15, 1948 |